United States Patent [19]

Rutten et al.

[11] 4,202,467

[45] May 13, 1980

[54] VOLUMETRIC VALVE WITH INDEPENDENT DISPLAY AND RESETTING

[75] Inventors: Pierre L. Rutten, Nimes; François H. Danel, Uriage, both of France

[73] Assignees: Compagnie Nationale d'Amenagement de la Region du Bas-Rhone et du Languedoc; Assistance Industrielle Dauphinoise S.A., France

[21] Appl. No.: 847,610

[22] Filed: Nov. 1, 1977

[30] Foreign Application Priority Data

Nov. 5, 1976 [FR] France ................................. 76 34224

[51] Int. Cl.² ............................................ F16K 31/14
[52] U.S. Cl. ..................................................... 222/20
[58] Field of Search ................ 222/18, 20, 16; 239/66

[56] References Cited

U.S. PATENT DOCUMENTS

| | | | |
|---|---|---|---|
| 2,557,336 | 6/1951 | Buchanan | 222/20 |
| 3,497,106 | 2/1970 | Clarke | 222/20 |
| 3,810,562 | 5/1974 | Clarke | 222/20 |

*Primary Examiner*—Stanley H. Tollberg

[57] ABSTRACT

The invention relates to a volumetric valve which supplies a displayed liquid volume. This valve has a turbine which is rotated by the liquid and which drives a disk via a gear train. The disk rotates a spiral spring and a ring provided with a slot. A sliding push rod controls the opening of the valve flap and carries a lug which penetrates the slot. A knob makes it possible to vary the angular clearance between the slot and the lug, which determines the displayed volume.

7 Claims, 5 Drawing Figures

VOLUMETRIC VALVE WITH INDEPENDENT DISPLAY AND RESETTING

BACKGROUND OF THE INVENTION

The present invention relates to volumetric valves which close automatically when a predetermined quantity of liquid has passed through.

The technical field of the invention is the construction of volumetric valves and in particular irrigation valves.

Irrigation or volumetric valves are known which have a programming device on which is displayed a given volume and which close automatically when they have discharged the displayed volume. These valves have a turbine which is rotated by the water passing through the valve, which by means of a reducing gear train drives a resetting and display button and a cam which automatically controls the closing of the valve flap when the button has turned by a predetermined angle. After each operating cycle, it is necessary to reset the volumetric valves so that they are ready for a new cycle. Resetting is brought about by turning the display button by an angle which determines at the same time the displayed volume for the new cycle.

A first disadvantage is that a resetting is obtained by rotating the display button which makes the resetting by hydraulic means more difficult to obtain than by a translation movement.

Another disadvantage is that the resetting and display of a new flow are realized by one and the same button. Therefore, this operation requires a certain amount of attention to be paid, although frequently the volumes to be displayed remain unchanged for successive cycles, the operator having to remember the reference values which are not displayed.

A third disadvantage which directly results from the two abovementioned disadvantages is that remote control of the resetting process is difficult and even impossible to obtain which complicates the operation of the systems, permitting neither cascade operations in which the closing of one volumetric valve automatically remotely controls the resetting of the following valve, nor closed loop operation evolving from the first operation.

BRIEF SUMMARY OF THE INVENTION

One of the problems of the present invention is to provide volumetric valves in which resetting is easy to control and remotely controlled.

A further problem of the invention is to provide volumetric valves in which it is possible to lock the flow display device, making it possible to control, for example, the repetitive distribution of the same water volume during each cycle.

A volumetric valve according to the invention comprises a meter which measures the volume of the liquid passing through the valve and a detector, which has an adjustable threshold, which automatically controls the closing of the valve flap when the volume reaches the displayed threshold.

The present invention solves the problem by means of a valve of the type which comprises on the one hand a resetting device which brings about the reopening of the flap and the zeroing of the meter and on the other hand a threshold display device, said devices being independent of one another.

According to a preferred embodiment, a valve according to the invention is an improvement of a known valve comprising a turbine rotated by the liquids passing through the valve, a gear train driven by said turbine, a rotary knob which displays a driven and regulatable volume and a cam which is rotated by said gear train and which automatically controls the closing of the valve flap when the displayed volume has passed through the valve.

The improved valve according to the invention comprise a sliding push rod which controls the reopening of the flap and the resetting of the cam by a displacement in translation. Preferably, the cam comprises a disk which is rotated by the gear train and drives with it an energy accumulation device which tends to bring it against a fixed stop and by a projecting lug carried by said push rod, the latter being equipped with a spring which maintains the lug engaged against a ring which has a slot into which the lug can penetrate. One of the two members constituted by the slot and the lug is integral in rotation with the disk, in such a way that the rotation of the latter varies the angular clearance between the slot and the lug and when the latter two face one another the lug penetrates the slot and the push rod slides under the action of the spring and automatically closes the flap. By displacing the push rod in translation in opposition to the spring, the flap is opened and the lug is disengaged from the slot, which frees the disk which is drawn against the stop.

The resetting button is integral in rotation with that of the two members constituted by said slot and said lug, which is not integral in rotation with the disk, in such a way that the rotation of the button makes it possible to modify the angular clearance existing between said member which is integral with the button and the fixed position occupied by the member fixed to the disk when the disk is in abutment and said angular clearance determines the displayed volume.

Advantageously, a volumetric valve according to the invention comprises a remotely controlled resetting device which initiates the translation of the push rod. Preferably, said resetting device is a jack operated by the liquid circulating in the pipe on which said valve is placed.

In the case of an installation having several branches arranged in parallel on the same pipe, whereby each has a volumetric valve followed by a hydraulic valve maintained open by the pressure in the branch, it is possible to obtain a cascade or closed loop operation by providing each branch with a pipe which leads to the following branch and which on the one hand controls the resetting of the volumetric valve and on the other the opening of the hydraulic valve.

As a result, the invention leads to new hydraulic valves.

These valves have several advantages. The independence between the remaining push rod and the programmed flow display knob makes it possible to lock the latter knob in such a way that the valve discharges the same volume of liquid during successive cycles, making it possible to use a valve, for example, for metered water distribution where it at the same time acts as a meter.

In addition, it is possible to modify the displayed volume in all open or closed positions of the valve.

In most applications, the programmed volumes remain constant during numerous successive cycles. In this case, resetting by a push rod becomes a purely mechanical operation which can either be carried out manually by an operator who does not have to think or by remote control.

It is easy to remotely control the displacement in translation of the push rod, particularly by means of an electromagnet or a hydraulic or pneumatic jack, which can be operated by the pressure of the liquid circulating in the pipe. This jack can be incorporated in the valve.

In this case, the volumetric valve can be associated with a hydraulic valve positioned downstream, normally opened by the pressure of the liquid circulating in the pipe and which is maintained closed by causing the liquid pressure to act on a diaphragm which controls the flap. The hydraulic valve can be separate from the volumetric valve or can be incorporated in the latter. It is possible to control in cascade or even in closed loop several branches in parallel on the same pipe. It is even possible to obtain a closed loop operation with two branches only which then alternatively discharge volumes of water which may differ. Such valves can be used for mixing liquids in given proportions.

BRIEF DESCRIPTION OF THE DRAWINGS

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made, as desired, by those skilled in the art without departing from the invention and the scope of the appended claims. In the drawings:

DETAILED DESCRIPTION OF THE PREFERRED EMBODIMENTS

Figure 1:
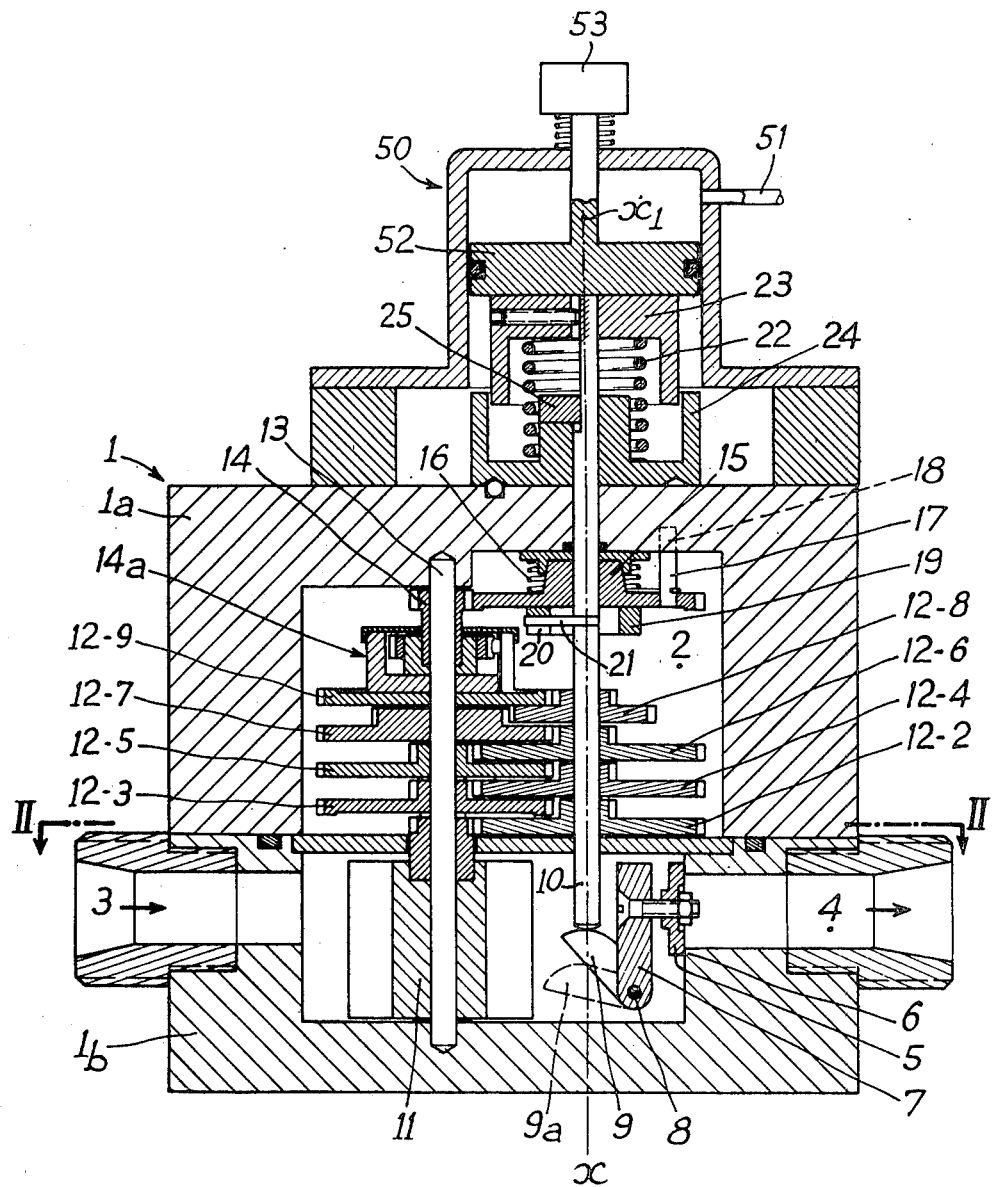
FIG. 1 is a vertical section through a valve according to the invention.
Figure 2:
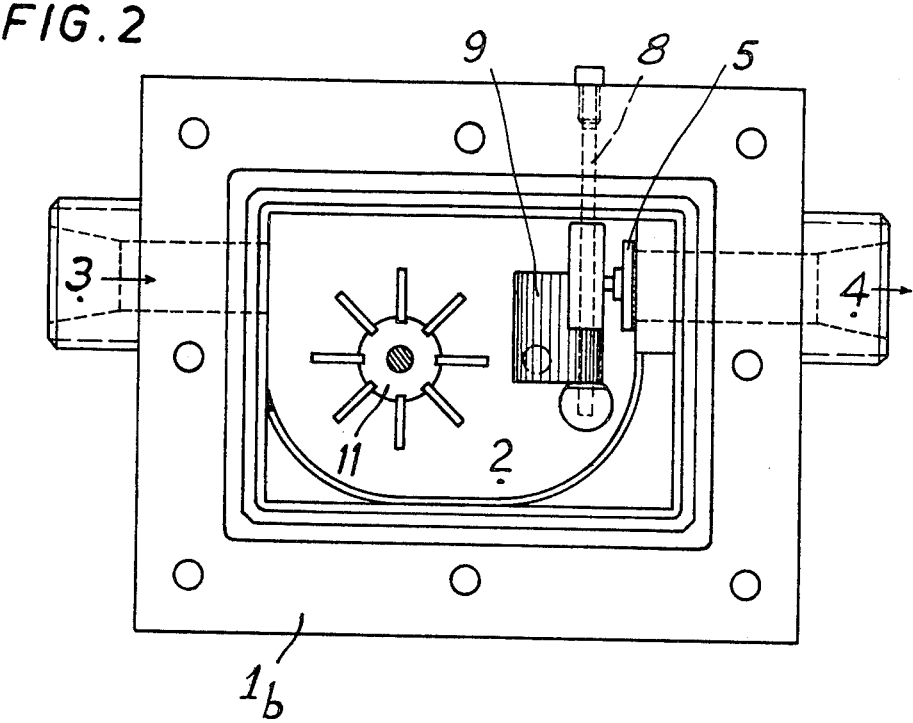
FIG. 2 is a plan view according to II—II of the lower part of the valve body of FIG. 1.

FIGS. 1 and 2 show a volumetric valve which comprises a valve body 1 constituted for example by two parts 1a and 1b defining a cavity 2. The lower valve body 1b has liquid intake and discharge openings 3 and 4 which pass through the valve in the direction of the arrows. The valve has valve head or a flap 5 which is supported on a seat 6 by the liquid pressure. Flap 5 is carried by a lever 7 articulated about a spindle 8 which carries a member 9 on which is supported a vertically sliding push rod 10. The upper face of member 9 is cylindrical and the lower end of push rod 10 is convex in such a way that contact between the push rod and the member is substantially punctiform and does not disturb the rotation of the push rod about which axis x x1.

Cavity 2 contains a turbine 11 which is rotated by the fluid flow passing through the valve at a speed proportional to the discharged quantity.

Turbine 11 drives a reducing gear train constituted by pinions 12.1, 12.2, 12.3 ... 12.9. Pinions 12.3, 12.5, 12.7 and 12.9 pivot about a pin 13, whilst pinions 12.2, 12.4, 12.6 and 12.8 pivot about push rod 10 which serves as an axis for the same. The reduction coefficient is very high, e.g. approximately 100,000. The gear train constitutes a meter which integrates the flow rate measured by the turbine. Pinion 12.9 drives a pinion 14 via a torque limiter 14a. Pinion 14 drives a disk 15 which is a toothed pinion which pivots about an axis constituted by push rod 10. Pinion 15 acts as a cam and controls the automatic closing of flap 5. To this end, pinion 15 drives with it an energy accumulation device constituted, for example, by a spiral spring 16 or by any other equivalent device.

Pinion 15 carries a finger 17 and spring 16 maintains said finger in engagement with a stop 18 which is fixed to body 1a.

Pinion 15 carries on one of its faces a ring 19 which has a slot 20, for example a radial groove. Ring 19 is fixed to pinion 15. Push rod 10 carries a projecting lug 21 having a configuration such that it penetrates slot 20. When finger 17 is an abutment, slot 20 occupies a fixed position and the angular clearance between this position and the position of lug 21 determines the displayed volume. Push rod 10 is provided with a spring 22 which forces it upwards being supported on cap 23.

Operation is as follows. At the start of a cycle, lug 21 is placed in slot 20 and push rod 10 is maintained by spring 22 in the upper position shown in FIG. 1. It frees member 9 and flap 5 is closed. The start of a cycle a vertical thrust is exerted on cap 23 in opposition to spring 22 in such a way that push rod 10 slides vertically. The lower end of the push rod moves member 9 into position 9a, shown by dotted lines and the flap opens.

At the same time, friction between lug 21 and the wall of slot 20 against which it is applied by spiral spring 16 leads to lug 21 guiding pinion 15 downwards in such a way that the teeth of pinion 15 are disengaged from the teeth of pinion 14. Pinion 15 is supported against a fixed stop which stops its downward movement and lug 21 continues to descend with push rod 10 in such a way that it is disengaged from slot 20. At this time, pinion 15 becomes free in rotation. Spiral spring 16, which is wound up, brings finger 17 against stop 18. On discontinuing to press on button 23, lug 21 is supported against the lower face of ring 19 and prevents the push rod from rising again. The valve remains open and it is reset for a new cycle.

For as long as water or any other liquid circulates through the valve, turbine 11 rotates pinion 15 until the time when slot 20 faces lug 21 and at this time the push rod is drawn upwards by spring 22 and flap 5 closes again.

In order to change the displayed volume, the angular clearance between the position of slot 20 with pinion 15 in abutment and lug 21 is varied. For this purpose, rotary knob 24 is operated, said knob rotating push rod 10 via a key 25 or a grooved shaft in such a way that the push rod is free to move in translation.

The modification of the displayed volume is completely independent of the resetting and can be carried out with the valve in the open or closed positions in the direction which increases or decreases the programmed volume.

If the valve is closed, the lug 21 in slot 20 drives with it ring 19 and pinion 15, but as resetting finger 17 strikes against stop 18 the initial position of slot 20 remains unchanged. In this case, pinion 15 meshes with pinion 14 and as the coefficient of reduction is very high, the gear train is irreversible. Torque limiter 14a intervenes to disengage pinion 14 from the gear train and prevent any danger of fracture.

If it is desired to modify the displayed volume when the valve is open, lug 21 is then disengaged from slot 20 and on rotating knob 24 it slides on ring 19 without driving the latter.

In addition, FIG. 1 shows a valve equipped with a remotely controllable resetting device, for example a jack 50 having a pressurized liquid intake 51 acting on a piston 52 which is supported on cap 23 in order to make push rod 10 slide downwards. Jack 50 is fixed to the valve body in such a way that the rearming knob 24 remains accessible and freely rotatable. It has a push rod 53 which permits the manual resetting of the valve.

Figure 3:
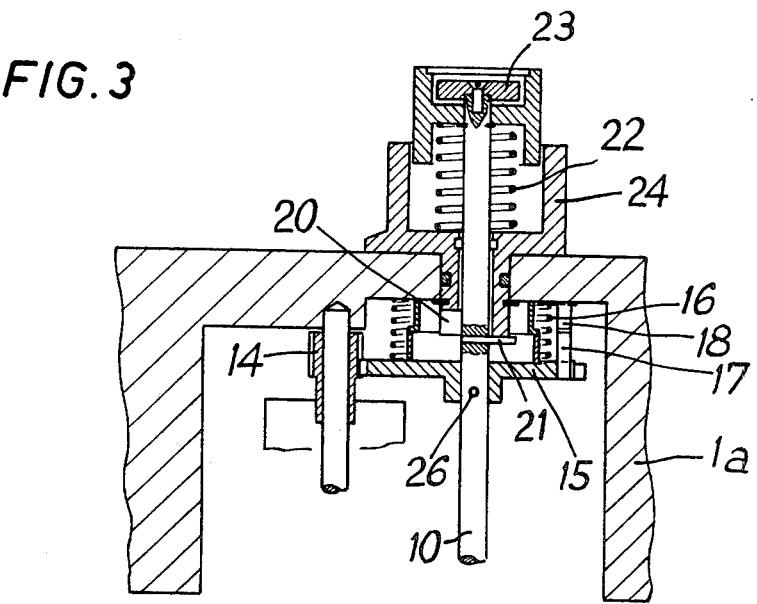
FIG. 3 is a larger scale vertical section of the upper part of a different embodiment of the valve according to the invention.

FIG. 3 is a part vertical section of a variant. Identical parts are given the same reference symbols.

In this variant, pinion 15 is keyed on push rod 10, for example by a key 26 and when it is rotated by pinion 14, it winds up the spiral spring 16 and rotates push rod 10, lug 21 and cap 23 which carries a pointer indicating the position of lug 21.

Rearming knob 24 has a slot 20 into which penetrates lug 21 and at this time spring 22 forces the push rod upwards and closes the valve. At the same time the teeth of pinion 15 are disengaged from those of pinion 14. For resetting purposes, the push rod is displaced downwards in such a way that lug 21 is disengaged from slot 20 and spring 16 rotates pinion 15 and brings finger 17 against stop 18. In this abutment position, lug 21 occupies a constant position. The display is modified by angularly displacing slot 20.

Figure 4:
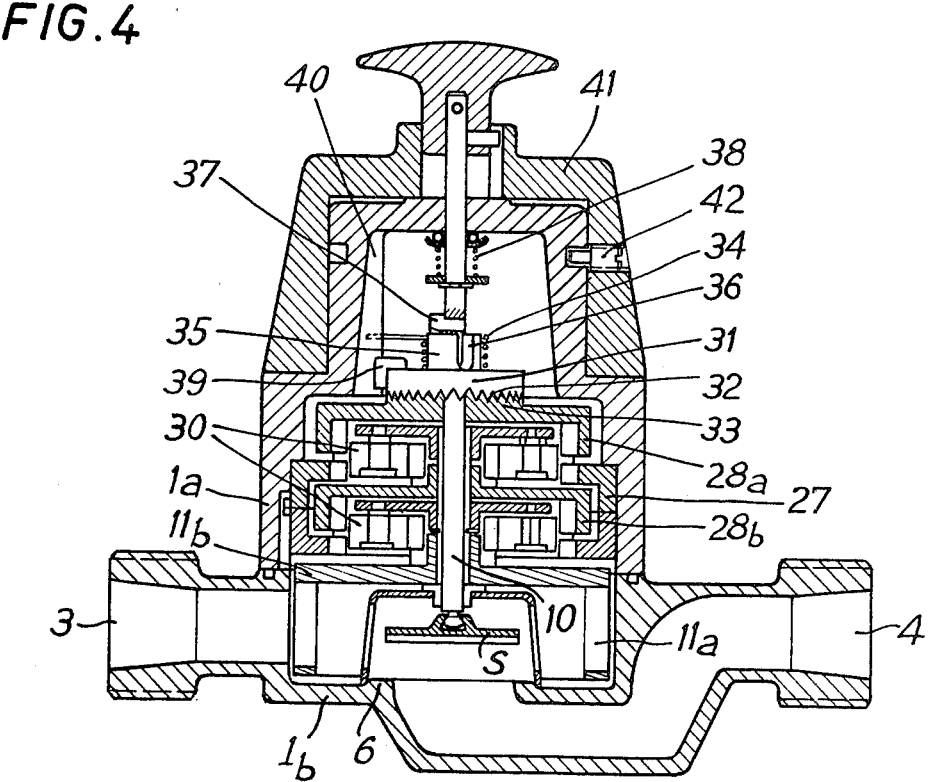
FIG. 4 is a vertical section of another embodiment of the valve according to the invention.

FIG. 4 shows a vertical section of another embodiment. Identical parts are given the same reference symbols.

In this embodiment, flap 5 is suspended on the lower end of push rod 10 and the turbine comprises blades 11a vertically and radially suspended below a disk 11b. This turbine drives an epicyclic gear train having fixed wheels 27, movable wheels 28a, 28b, pinions 29 and planet wheels 30. This valve has a cam 31 constituted by a disk carrying teeth 32 which mesh with teeth 33 carried by the upper face of wheels 28a. Disk 31 drives a spiral spring 34. It is integral with a ring 35 having a slot 36. Push rod 10 carries a lug 37 and is provided with a spring 38 which applies lug 37 against the upper face of ring 35. Disk 31 has a projection 39 which abuts against a rib 40 of valve body 1a.

Operation is as follows: turbine 11 drives wheel 28a which drives disk 31 and slot 36 until the latter faces lug 37. At this time, lug 37 penetrates slot 36 and spring 38 forces push rod 10 downwards and closes the valve. For resetting purposes, the push rod is drawn upwards which has the effect of raising disk 31 in such a way that teeth 32 and 33 are disengaged and then lug 37 is extracted from slot 36. Spring 34 brings the disk into abutment and on releasing the push rod the valve is reset.

In order to modify the display, lug 37 is angularly displaced by means of the knob 41 which rotates push rod 10. Screws 42 make it possible to lock knob 41 in a given display position.

Figure 5:
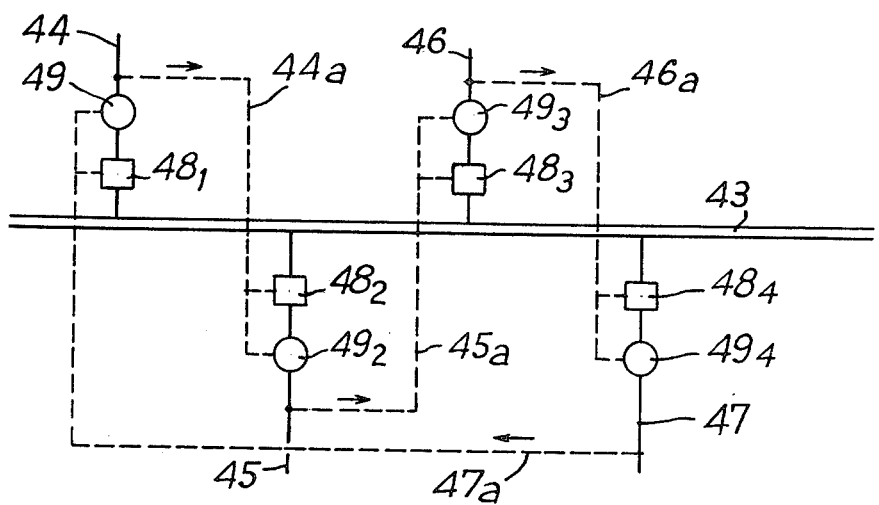
FIG. 5 is a diagrammatic plan view of a liquid distribution installation having several branches.

FIG. 5 shows a pipe 43 for distributing a liquid, for example irrigation water, on which are branched in parallel several branches 44, 45, 46, 47. The number of branches is equal to at least two.

Each branch is equipped with a volumetric valve 48 provided with a hydraulic jack which acts on the resetting push rod and a hydraulic valve 49 mounted in series. The hydraulic valve 49 are valves which are normally open, being maintained in this position by the pressure of the liquid circulating in the valve and whose closing can be controlled by causing a pressurized liquid to act on a diaphragm which controls the closing of the flap. The closing of hydraulic valve 49 is more rapid than the opening of volumetric valves 48.

A small diameter pipe respectively 44a, 45a, 46a and 47a is branched downstream of the hydraulic valve on each branch and said pipe terminates on the one hand at the resetting jack of volumetric valve 48 of the following branch and on the other at the diaphragm controlling the closing of hydraulic valve 49 of the following branch.

Operation is as follows: initially all the volumetric valves 48 are closed and therefore all the hydraulic valves 49 are open.

One of the volumetric valves, for example valve 48.1 of branch 44 is reset by any appropriate means and from this time the operation continues in cascade. Thus, the opening of valve 48.1 causes the supply of branch 44a which resets volumetric valve 48.2 and closes hydraulic valve 49.2. When valve 48.1 closes again, valve 49.2 opens and branch 45 is supplied together with branch 45a and the same operations reoccur in cascade or closed loop but the last branch has a pipe 47a which controls valve 48.1 and 49.1.

The invention is not limited to the embodiments described and represented hereinbefore and various modifications can be made thereto without passing beyond the scope of the invention.

What is claimed is:

1. A volumetric valve for automatically supplying a determined and adjustable volume of liquid comprising:
   a valve head;
   a turbine rotated by the liquid which passes through the valve;
   a gear train rotated by said turbine;
   a rotary knob which enables to adjust and display said determined volume;
   a cam rotated by the last pinion of said gear train, which cam automatically controls the closing of said valve head when said last pinion has rotated by a given angle;
   a spiral spring which is driven in rotation by said cam;
   and a sliding push rod which may be displaced in translation and which simultaneously opens said valve head, disengages said cam from said gear train and enables said cam to be brought back in its initial position by said spiral spring so that the volumetric valve is reset for a new cycle in which the same determined volume of liquid is supplied again.

2. A volumetric valve for automatically supplying a determined and adjustable volume of liquid comprising:
   a valve head;
   a turbine rotated by the liquid which passes through the valve;
   a gear train rotated by said turbine;
   a rotary knob which enables to adjust and display said determined volume;
   a cam which comprises a disk which is rotated by the last pinion of said gear train and which carries a movable finger, a ring carrying a slot, and an energy accumulation device which is rotated by said disk, and a fixed stop on which said movable finger comes into abutment;
   a sliding push rod carrying a projecting lug;

a spring acting on said push rod for maintaining said lug supported against said ring;

and one of the two members constituted by said slot and said lug is driven in rotation with said disk in such a manner that the rotation of the latter varies the angular clearance between said slot and said lug until said lug may penetrate the slot and said push rod slide under the action of said spring and automatically close said valve head and, by displacing in translation said push rod in opposition to said spring, said valve head is opened, the lug is disengaged from said slot, said disk becomes free and is driven back by said energy accumulation device until said movable finger comes into abutment against said fixed stop.

3. A valve according to claim 2, wherein the energy accumulation device is a spiral spring which opposes the rotation of the disk and retains the movable finger in engagement against the fixed stop.

4. A valve according to claim 2, wherein the rotary knob is rotatable with the other of said two members in such a manner that the rotation of the knob makes it possible to modify the angular clearance between the said other member and the fixed position occupied by the said one member when the movable finger is in abutment against the fixed stop, and this angular clearance determines the displayed volume.

5. A valve according to claim 2, wherein the gear train has a very high coefficient of reduction and a torque limiter is placed between the last pinion of the gear train and the cam.

6. A valve according to claim 2 comprising in addition a remotely controlled resetting device which brings about the displacement in translation of the push rod.

7. A valve according to claim 6, wherein the resetting device is a jack supplied by the liquid which circulates in the valve.

* * * * *